April 19, 1966 M. BENTELE 3,246,636
ROTARY COMBUSTION ENGINE AND METHOD OF OPERATING SAME
Original Filed May 1, 1962 7 Sheets-Sheet 1

INVENTOR.
MAX BENTELE
BY
William V. Ebs
HIS ATTORNEY

April 19, 1966  M. BENTELE  3,246,636
ROTARY COMBUSTION ENGINE AND METHOD OF OPERATING SAME
Original Filed May 1, 1962  7 Sheets-Sheet 2

INVENTOR.
MAX BENTELE
BY
William V. Els
HIS ATTORNEY

April 19, 1966  M. BENTELE  3,246,636
ROTARY COMBUSTION ENGINE AND METHOD OF OPERATING SAME
Original Filed May 1, 1962  7 Sheets-Sheet 3

INVENTOR.
MAX BENTELE
BY
William V. Ebs
HIS ATTORNEY

April 19, 1966  M. BENTELE  3,246,636
ROTARY COMBUSTION ENGINE AND METHOD OF OPERATING SAME
Original Filed May 1, 1962  7 Sheets-Sheet 6

INVENTOR.
MAX BENTELE
BY
William V. Els
HIS ATTORNEY

April 19, 1966　　　　M. BENTELE　　　　3,246,636
ROTARY COMBUSTION ENGINE AND METHOD OF OPERATING SAME
Original Filed May 1, 1962　　　　7 Sheets-Sheet 7

Fig. 15

INVENTOR.
MAX BENTELE
BY William V. Ebs
HIS ATTORNEY

United States Patent Office 3,246,636
Patented Apr. 19, 1966

3,246,636
ROTARY COMBUSTION ENGINE AND METHOD
OF OPERATING SAME
Max Bentele, Ridgewood, N.J., assignor to Curtiss-Wright
Corporation, a corporation of Delaware
Continuation of application Ser. No. 191,529, May 1,
1962. This application Apr. 15, 1965, Ser. No. 450,246
9 Claims. (Cl. 123—8)

This application is a continuation of my application Serial No. 191,529 filed May 1, 1962 now abandoned.

The invention relates to rotary combustion engines of the type shown, for example, in Patent No. 2,989,065 issued June 13, 1961, and is particularly directed to a rotating combustion engine having the capability of operating efficiently on a variety of fuels.

Rotating combustion engines of the type shown in the aforementioned patent have axially spaced end walls interconnected by a peripheral wall to form a cavity therebetween, and an inner body or rotor received within said cavity between the cavity end walls. The inner surface of said peripheral wall preferably is parallel to the axis of said cavity and, as viewed in a plane transverse to said axis, said inner surface has a multi-lobed profile which preferably is an epitrochoid. The axis of said rotor is parallel to but spaced from the axis of the outer body cavity and said rotor has axially spaced end faces disposed adjacent to said outer body end walls and also has a plurality of circumferentially spaced apex portions. The rotor is rotatable relative to the outer body such that said apex portions continuously engage the inner surface of said peripheral wall to form a plurality of working chambers between said rotor and peripheral wall which vary in volume during engine operation. For efficient operation of the engine, its working chambers are sealed and an effective seal is therefore provided between each rotor apex portion and the inner surface of the peripheral wall of the outer body as well as between the end surfaces of the inner rotor and the end walls of the outer body.

Such engines include an intake port, an exhaust port and fuel ignition means. In Otto engines, fuel is admitted as part of a combustible mixture of fuel and air through the intake port, whereas in diesels fuel is admitted through a fuel injection nozzle and only air is admitted through the intake port. The working chambers of the engine have a cycle of operation which includes the four phases of intake, compression, expansion and exhaust. As described in the aforementioned patent, this cycle of operation is achieved as a result of the relative rotation of said inner rotor and outer body and for this purpose both said inner rotor and outer body may rotate or one, preferably the inner rotor, may rotate while the outer body is stationary.

In the rotary combustion engine of the invention, fuel is injected into the engine through a nozzle which is judiciously located in the outer body peripheral wall, preferably in a common recess with ignition means. Such ignition means ignites the fuel substatnially as soon as injection is initiated. The rate and duration of injection are adjusted to the air mass transfer past the point of injection with injection being terminated prior to completion of the air mass transfer past said point.

The principal object of the invention is to provide a rotary combustion engine so constructed and so operated that fuel is burned at a controlled rate whereby the engine is rendered capable of operating on a wide variety of fuels whether of high, intermediate or low octane or cetane rating without detonation.

It is also an object of the invention to provide a rotary combustion engine which will operate effectively on low ignition quality fuels at lower compression ratios, such as 6 to 12, than diesel rotary combustion engines. It is well known that rotary combustion engines take on certain undesirable characteristics when designed for high-compression ratios. For example, the engines become bulkier and heavier for the same displacement; engine speed is lowered for the same apex velocity of the rotor and output decreases correspondingly for an equivalent brake mean effective pressure; eccentricity decreases and this adversely affects the design of the shaft and bearings; and changed trochoid and rotor geometries lead to a combustion chamber shape which is unfavorable to effective combustion. Furthermore, inherent difficulties are encountered, especially with low ignition quality fuels, when starting, at low speeds and in the low load range in high-compression rotating combustion engines operating on the diesel principle. The avoidance of such disadvantages in an engine capable of burning low ignition quality fuels is a significant advantage of the invention.

Another object of the invention is to provide a rotary combustion engine which will perform satisfactorily without extraneous devices such as preheaters for raising the temperature of the fuel or air or both.

Another object of the invention is to provide a rotary combustion engine in which delayed combustion effects on performance, fuel economy and exhaust smoke are avoided.

Still another object of the invention is to provide a rotary combustion engine in which high air utilization with low combustion pressures, as compared to such pressures in diesels, is achieved at high speeds.

Other objects and advantages of the engine of the invention will become apparent during a reading of the specification taken in connection with the accompanying drawings in which.

Figure 1:
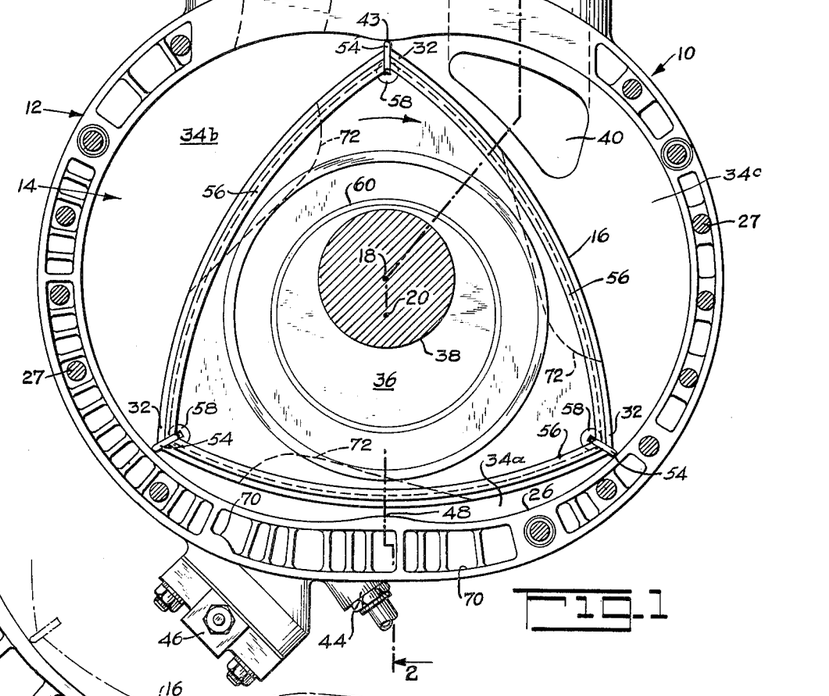
FIG. 1 is a transverse sectional view, taken along the line 1—1 of FIG. 2, of a rotary combustion engine embodying the invention.
Figure 2:
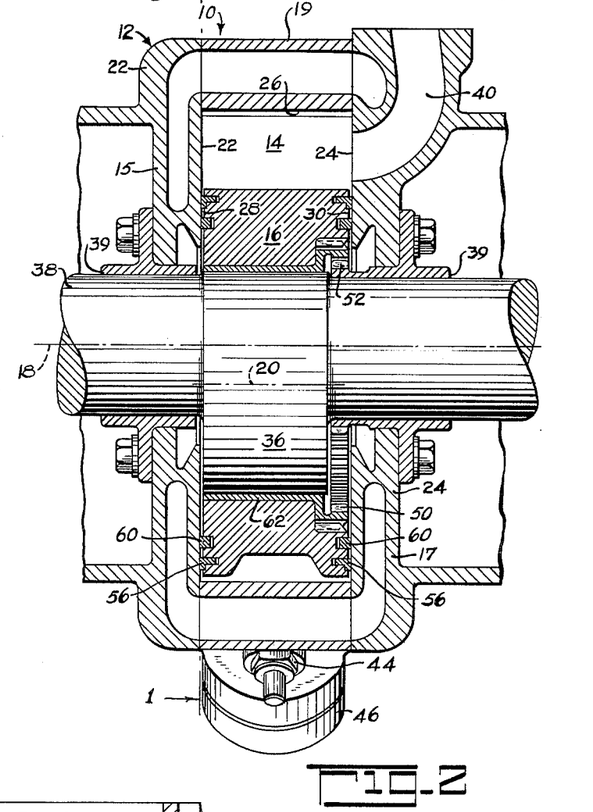
FIG. 2 is a sectional view taken along the broken line 2—2 of FIG. 1.

Referring first to FIGS. 1 and 2 of the drawing, a rotary internal combustion engine according to the invention is indicated by reference numeral 10. The engine 10 comprises an outer body 12 having a cavity 14 within which an inner body 16 is received, said bodies being relatively rotatable and having laterally spaced parallel axes 18 and 20 respectively. The outer body 12 comprises end housings 15 and 17 with axially spaced end walls 22 and 24 respectively, and rotor housing 19 with peripheral wall 26 which interconnects the end walls to form said cavity 14. The end housings 15 and 17 are secured to rotor housing 19 as by bolts 27. In a plane normal to its axis 18, the cavity 14 has a multi-lobed profile which preferably is an epitrochoid. In the specific embodiment illustrated by outer body cavity has two lobes, however, the outer body cavity may have any number of lobes.

The inner body 16 has axially spaced end faces 28 and 30 disposed adjacent to said outer body end walls and an outer surface with a plurality of circumferentially spaced apex portions 32, said apex portions preferably being one more in number than the number of said outer body lobes. Thus, as illustrated, the inner body has three apex portions 32. The inner body apex portions 32 are in continuous engagement with the multi-lobed inner surface of the outer body to form a plurality (three in the embodiment illustrated) of working chambers 34a, 34b and 34c between said two bodies which vary in volume upon relative rotation of the inner and outer bodies during engine operation. Between its apex portions the profile of outer surface of the inner body is such as to operate in an interference free manner relative to the outer body. Thus, as illustrated, the outer surface of the inner body has a triangular profile with outwardly arched sides.

In the embodiment illustrated, the outer body 12 is stationary while the inner body is journaled on an eccentric portion 36 of a shaft 38. The shaft 38 is supported by bearings 39 carried by the outer body 12 and said shaft is co-axial with the geometrical axis 18 of the outer body 12 while the shaft eccentric portion 36 is co-axial with the inner body 12 which, as stated, is journaled on said eccentric portion. During engine operation the inner body 16 has a planetary motion (clockwise in FIG. 1) about the axis 18 of the outer body whereupon the working chambers 34a, 34b and 34c vary in volume such that in each rotation of the inner body about the axis 18 of the outer body each chamber has two positions of minimum volume and two positions of maximum volume.

An intake passage 40 is provided in the outer body end housing 17 for admitting air to the working chambers 34a, 34b and 34c successively, and an exhaust passage 42 is provided in rotor housing 19 for exhausting combustion gases from said chambers, said passages being disposed on opposite sides of a junction 43 of the lobes of the outer body cavity with the exhaust port being on the upstream side of said junction relative to the direction of rotation of the inner rotor. A spark plug 44 and fuel injection nozzle 46 are provided in the outer body peripheral wall on the side opposite to the intake and exhaust passages and adjacent to the lobe junction 48. As is apparent from the drawing the lobe junctions 43 and 48 are points of minimum radius on the multi-lobed profile of the inner surface of the peripheral wall 26. A minimum volume position of each working chamber 34a, 34b and 34c in the region of lobe junction 48 (lower chamber position in FIG. 1) defines a top dead center position for the inner body. The rotor therefore passes through three top dead center positions during each rotation.

During engine operation each of the working chambers has a cycle of operation including the four phases of intake, compression, expansion and exhaust. In order to facilitate the relative motion of the inner body relative to the outer body, an internal gear 50 is, as illustrated, secured to the inner body and disposed co-axially with the axis 20 of said inner body. The internal gear 50 is disposed in mesh with a fixed gear 52 secured to the outer body, said fixed gear being co-axial with the shaft 38. Although, as illustrated and described, the outer body 12 is stationary and the inner body 16 has a planetary motion about the axis 18 of the outer body, it will be apparent that either body may be stationary while the other rotates or both said bodies may rotate in the same direction about their own axes.

For efficient operation the working chambers are sealed between the apex portions 32 of the inner body 16 and the peripheral wall 26 of the outer body 12 as well as between the inner body end surfaces and the outer body end walls 22 and 24. As illustrated, this sealing means includes apex seal strip means 54 carried by the inner body 16 and extending along each apex portion 32 of said inner body for sealing engagement with the inner surface of the peripheral wall 26 of the outer body 12 and end face sealing elements 56 carried by each end face sealing element 56 extending from one apex portion to the adjacent apex portion of the inner body for sealing engagement with the adjacent end wall of the outer body 12. In addition, intermediate sealing members 58 are provided at each end of each apex portion of the inner body 16 for sealing cooperation between adjacent ends of the seal means 54 and seal elements 56. An oil seal 60 is also provided at each end face of the inner body 16 adjacent to the bearing 62 between said inner body and the shaft eccentric 36.

As the engine operates, the various phases of the cycle in the working chambers 34 take place adjacent to the same portion of the outer body 12. Thus, for each working chamber combustion is initiated by fuel injection nozzle 46 and spark plug 44 which as already mentioned are located adjacent to the lobe junction 48 on the peripheral wall 26 of the outer body. Likewise, the engine port 40 and exhaust port 42 serve each of the working chambers 34a, 34b and 34c, such chambers being successively connected thereto.

Figure 6:
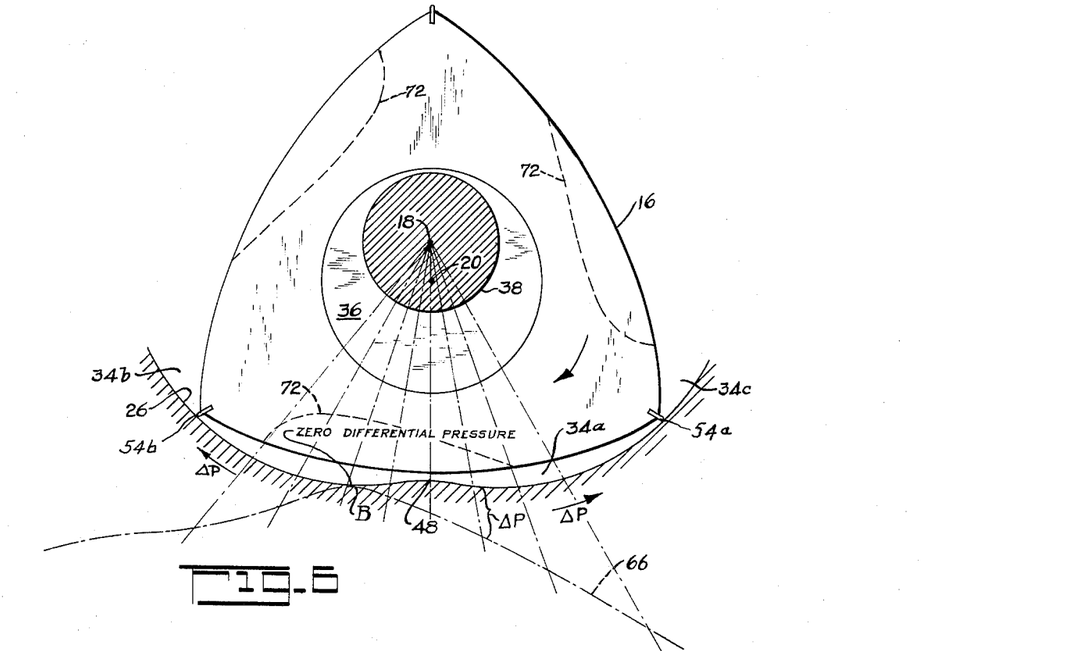
FIG. 6 is a diagrammatic view and a graph showing the magnitude of the pressure differential which exists across an apex seal at different locations of the seal on the inner peripheral wall of the outer body of the engine.

The nozzle 46 and plug 44 are located adjacent to lobe junction 48 with the fuel injection end of the nozzle and the electrodes of the plug, preferably in a recess 64 in the peripheral wall 26. For reasons explained hereinafter the recess is preferably located where pressure on both sides of an apex seal is substantially the time. This places the nozzle and plug on the downstream side of lobe junction 48 relative to the direction of rotation of the inner body, as shown. The manner in which the pressure differential $\Delta P$ across an apex seal varies in magnitude in the region of lobe junction 48 according to the instantaneous location of the seal for full load operation of the engine is shown by the line 66 in FIG. 6. Pressure is greater in a chamber 34a, 34b or 34c on the downstream side of an apex seal than in the chamber on the upstream side, for any position of the seal upstream from B, that is, the pressure differential acts against the seal to the right as viewed in the drawing. With inner body 16 in the position of FIG. 6, for example, pressure is greater in chamber 34a on the downstream side of seal 54a than in chamber 34c on the upstream side of the seal. As an apex seal moves toward location B the differential pressure diminishes until at B the pressure on both sides of the seal is the same. As the seal moves beyond B pressure in the chamber on the upstream side of the seal becomes increasingly greater than pressure on the downstream side of the seal so that the pressure differential acts to the left on the seal. Referring again by way of example to the position in which the inner body is shown in FIG. 6, pressure on the upstream side of seal 54b in chamber 34a is greater than pressure on the downstream side of the seal in chamber 34b. Although the pressure differential line 66 pertains to full load operation, and the magnitude of such pressure differential, as well as the shape of line 66, is subject to change with changing load conditions, any such change which might occur would only be slight.

Figure 3:
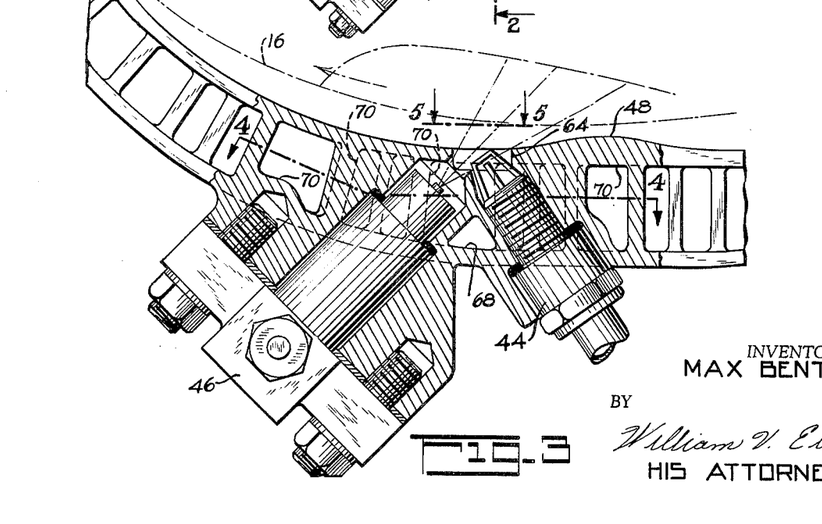
FIG. 3 is an enlarged transverse sectional view showing a portion of the outer body of the engine at the location of fuel injection and ignition means.
Figure 4:
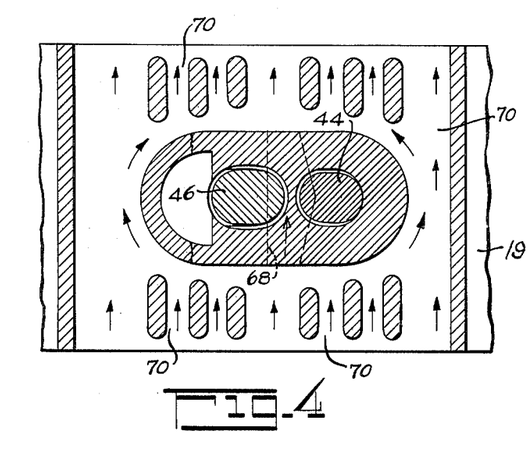
FIG. 4 is a sectional view taken on the broken line 4—4 of FIG. 3.
Figure 5:
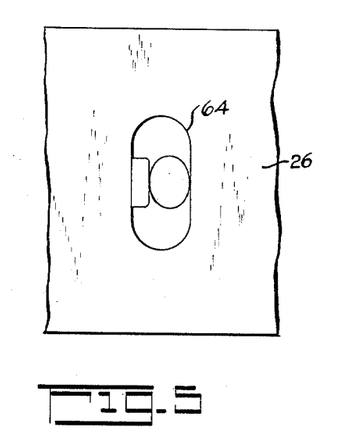
FIG. 5 is a view taken on the line 5—5 of FIG. 3 showing a peripheral wall recess for a spark plug and nozzle.

As shown in FIGS. 3–5 nozzle 46 and plug 44 are in a plane perpendicular to the inner and outer body axes, and extend at an angle to each other through the peripheral wall into recess 64, the inclination of the nozzle being such that fuel spray from the nozzle may penetrate combustion air upstream from the nozzle. With the nozzle and plug at an angle to each other in the peripheral wall room is available for an adequate cooling passage between the plug and nozzle. Such a passage is shown at 68 in FIGS. 3 and 4. Air or other cooling fluid flows through the passage 68 and other passages 70 in the housing as shown in FIG. 4, the passage 68 and other passages 70 shown in the drawing being part of the engine cooling system which may be of the type shown, for example, in Patent No. 3,007,460 issued November 7, 1961. The fuel injecting end of the nozzle and the electrodes of the plug are in close proximity such that fuel may be ignited substantially immediately once injection is initiated.

Figure 7:
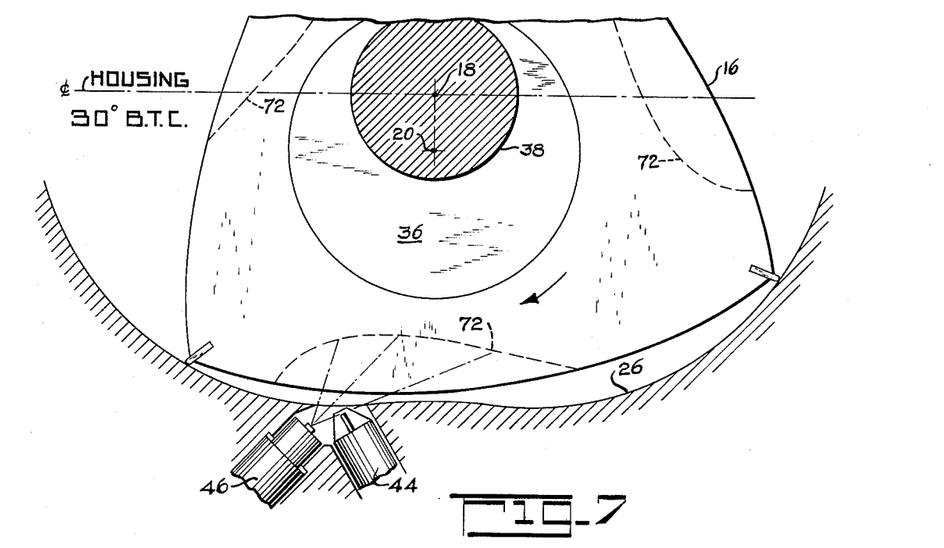
FIGS. 7 and 8 are diagrammatic views showing the relative positions of the rotor and fuel injection means at the beginning and end of fuel injection respectively.
Figure 8:
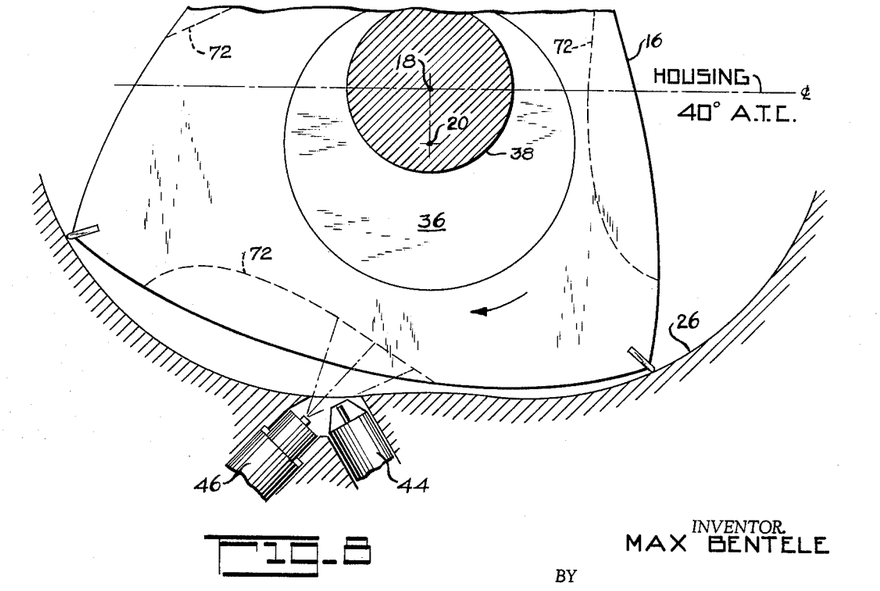

Fuel injection and ignition are initiated in each chamber after the intake of air into the chamber, while chamber volume is relatively small, but prior to the chamber reaching the lower minimum volume position of FIG. 1, that is, before each top dead center position of inner body 16. Injection is continued for a period of time after top dead center. With an engine having a peripheral wall with the form of a two-lobed epitrochoid as shown in the drawings and wherein the ratio of the angular velocity of shaft 38 to the angular velocity of inner body 16 is 3 to 1, injection and combustion may, for example, be initiated at 30° as measured on shaft 38 before each top dead center position of the inner body (FIG. 7) and fuel injection terminated at 40° after top dead center (FIG. 8). Combustion continues after injection is terminated and until the fuel has been consumed. At 30° before top dead center some air has already been moved past the nozzle and is available to support initial combustion. At 40° after top dead center the last portion of the fuel is sprayed into the air not yet moved by the rotor to the loctaion of the nozzle so that such air is efficiently utilized in combustion of the fuel and delay combustion with its detrimental effects avoided. There is therefore effective utilization of the air in the engine. Trough-like recesses 72, each forming a leading portion of a working chamber, are provided. Such a non-symmetrical recess, as compared to a recess of the same volume which is symmetric with respect to its working chamber provides a significantly greater mass of air for combustion near top dead center, and the amount of air moved through the region of fuel injection at the end of the combustion cycle is reduced. The recesses 72 should be such as to supply air to the region of fuel injection as required to support the main portion of combustion shortly after top dead center when most effective for the performance and efficiency of the engine.

As noted hereinbefore, the recess for the fuel injection nozzle and spark plug is preferably at the zero pressure differential location. This is a desirable location for the recess because at such location there is no leakage of combustion gases across an apex seal when the seal is at the recess. With a recess located downstream from the zero differential pressure location, leakage, if substantial, results in a significant loss of pressure in the combination chamber and an accompanying loss in power and efficiency. Substantial leakage across a recess located upstream from the zero differential pressure location would detrimentally affect volumetric efficiency and therefore power. Also, flow conditions within the combination chamber would be disturbed. For any location of the recess other than the zero differential pressure location such leakage would interfere with proper operation of the apex seal. The recess may be at a location other than the zero differential pressure location, but in such event the size of the recess is minimized to prevent a substantial amount of leakage. While a recess at the zero differential pressure location may be fairly large, as much as 5% of the minimum volume of a working chamber including the trough-like recess therein, a recess located at other than the zero differential pressure location should be more limited in size. A recess at a location other than the zero differential pressure location as shown, for example, in FIGS. 9 and 10 is preferably as small as possible, that is, only sufficiently large to accommodate the angle of the fuel spray, and in any event preferably has a volume which is not more than 2% of the said minimum volume of a working chamber including its recess.

It is also essential that the recess have a small volume to prevent fresh intake air from being significantly contaminated by combustion gases in the recess. It will be noted that in the engine of the drawing (see FIGS. 1 and 2) the recess is out of communication with a working chamber whenever the chamber is in communication with the exhaust port. There is no opportunity whatever for combustion gases which enter the recess during one period of combustion to escape to the atmosphere before the next period of combustion and the size of the recess must be limited to restrict contamination of intake air by exhaust gases entrapped in the recess. Although the position of the recess may vary somewhat from that shown in the drawings wherein it can never communicate through a working chamber with the exhaust port, the location of the recess in the engine of the invention is always such that it can never communicate with a particular working chamber for more than a small portion of the time during which the chamber is in communication with the exhaust port and it is always necessary to restrict the size of the recess to prevent significant contamination of intake air and a resulting loss in efficiency and power output of the engine.

Figure 9:
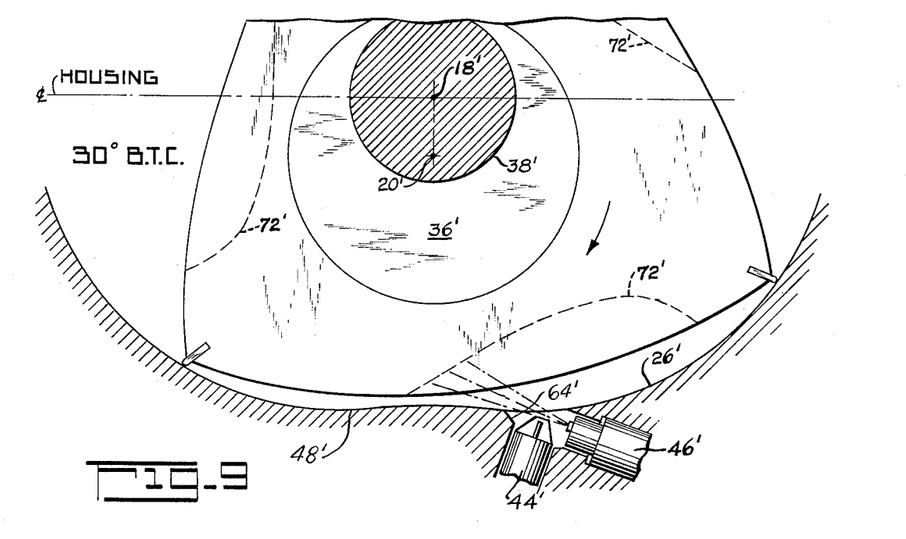
FIGS. 9 and 10 are diagrammatic views of an alternate construction showing the relative positions of the rotor and fuel injection means at the beginning and end of fuel injection respectively.
Figure 10:
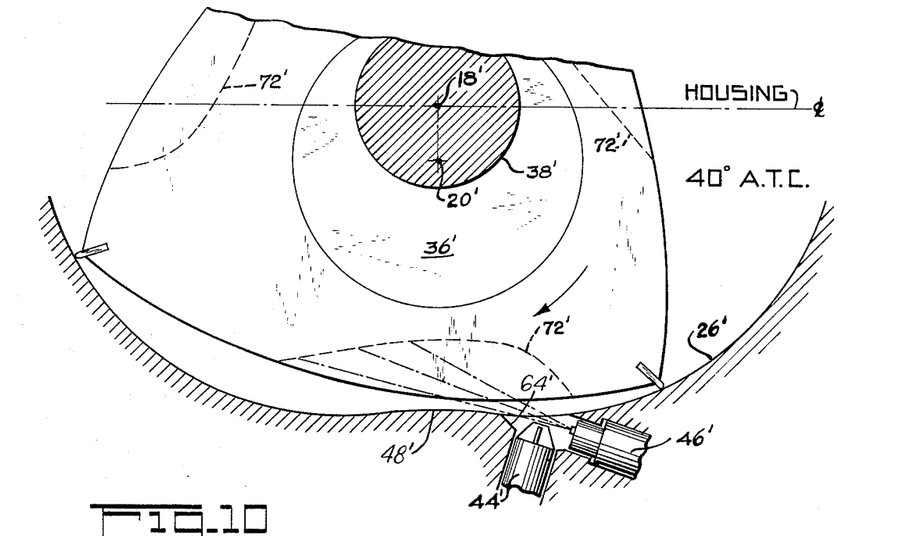

As shown in FIGS. 9 and 10 wherein parts corresponding to parts shown in FIGS. 1–5 are designated by the same reference character, but with a prime mark (′) added thereto, a fuel injection nozzle 46′ and plug 44′ are located in a recess 64′ which is located upstream from lobe junction 48′. With the nozzle and plug in this alternate position more air is moved past the nozzle prior to the beginning of injection at 30° before top dead center than when the nozzle and plug are located on the other side of the lobe junction. However, the nozzle 46′ on the upstream side of lobe junction 48′ is inclined to spray fuel into the air which has passed and thereby minimize the loss of such air. When injection is terminated, at 40° after top dead center, there is very little air not yet moved past the nozzle and burned, less than when the nozzle and plug are located on the downstream side of the lobe junction, and delayed combustion effects are avoided.

When the nozzle and plug are located upstream from the lobe junction as in FIGS. 9 and 10, each working chamber is provided with a trailing portion formed by a recess 72′. A substantially greater mass of air is provided for combustion near top dead center with such a recess than would be provided with a recess of the same volume which is symmetric or leading with respect to its working chamber. Also, the amount of air moved past the nozzle 46′ prior to the beginning of injection is reduced. The recesses 72′, forming the trailing portions of the working chambers, should be such that air is supplied to the region of fuel injection as required to support the main portion of combustion shortly after top dead center. For reasons already noted the volume of recess 64′ for nozzle 46′ and spark plug 44′ is preferably of minimum size and in any event no greater in volume than 2% of the minimum volume of a working chamber including the recess therein.

The nozzle and spark plug in the engine of the invention may be located side by side without having the fuel injecting end of the nozzle and the igniting end of the spark plug in a common recess, but having such fuel injecting and igniting ends of the nozzle and plug respectively substantially flush in the peripheral wall of the outer body of the engine. The nozzle should nevertheless be oriented to spray fuel upstream or downstream according to its location along the peripheral wall. With the nozzle located as in FIGS. 7 and 8, for example, the nozzle would be inclined to spray fuel upstream as described hereinbefore, and with the nozzle located as in FIGS. 9 and 10 it would be inclined to spray fuel downstream. With the nozzle and plug side by side and not in a common recess, but substantially flush with the inner peripheral wall, leakage across an apex seal at the location of the nozzle and plug is avoided. Also, because of the closeness of the fuel injecting end of the nozzle to the peripheral wall a wide angle fuel spray may be provided for.

Figure 11:
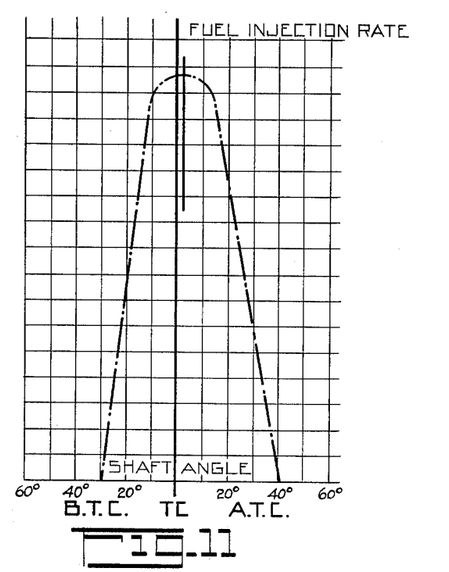
FIG. 11 is a graph showing the manner in which the rate at which fuel is injected into the engine is varied in accordance with rotor position.

A total amount of fuel is injected for full load operation during each fuel injection period, such as to provide substantially the proper stoichiometric mixture with the air which is transferred by rotation of the inner body into the region of injection during combustion. The rate at which the fuel is injected is varied, the fuel injection rate being scheduled to provide favorable combustion conditions commensurate with the mass transfer past the nozzle and the instantaneous heat release which produce the best indicated horsepower. A typical curve indicating the character of the injection is shown in FIG. 11. The engine is operated at less than full load by terminating injection sooner than otherwise. Although the timing of the beginning of injection is essentially constant, preferably means are provided for slightly adjusting such timing according to speed.

Figure 12:
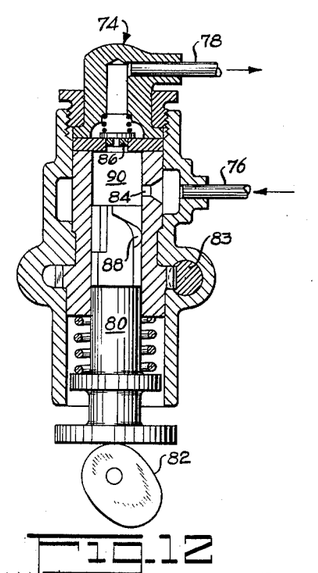
FIG. 12 is a diagrammatic view of a pump used to control the injection of fuel into the engine.

A fuel injection pump 74 (FIG. 12), which is of a conventional type commonly used in fuel metering systems, is provided for delivering fuel to the nozzle of the engine at the desired rate. Fuel is supplied through pump inlet 76 and delivered through outlet 78 in accordance with the stroke of plunger 80 which is actuated by a cam 82 driven from the engine shaft. Having due regard for the characteristics of the fuel injection system, the cam profile is designed to provide the desired rate of fuel injection as shown in FIG. 11. The plunger 80 can be positioned at different angles by a control rack 83, and pump timing thereby adjusted as may be desired for different engine r.p.m.'s. At a given angle of the plunger, inlet port 84 is closed when the top of the plunger covers it. From this point as the plunger rises fuel is forced through check valve 86 into outlet 70. Delivery continues until helical groove 88 in the plunger uncovers the inlet port 84 at which point pressure in the cylinder 90 drops to the inlet pressure and flow through the check valve 86 ceases.

Figure 13:
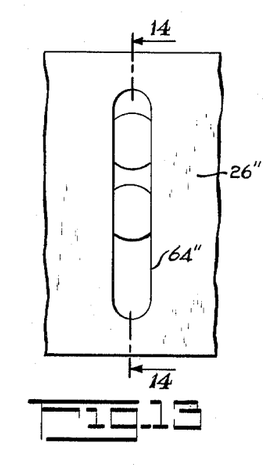
FIG. 13 is a view similar to FIG. 5 showing a modified form of recess for the fuel injection nozzle and ignition means, and taken on the plane of the line 13—13 of FIG. 14.
Figure 14:
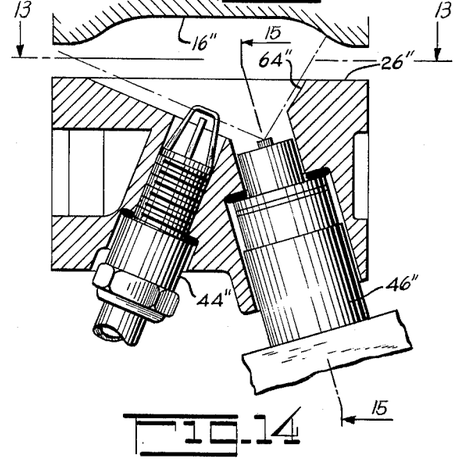
FIG. 14 is a sectional view taken on the line 14—14 of FIG. 13 showing the spark plug and nozzle which extend into the recess.
Figure 15:
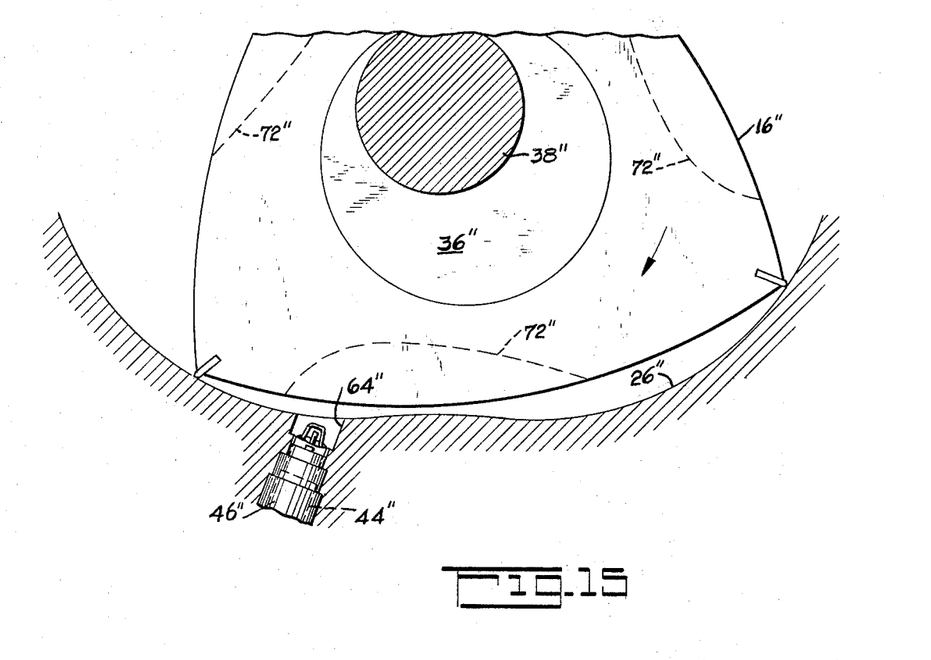
FIG. 15 is a diagrammatic view taken on the plane of the line 15—15 of FIG. 14 showing the nozzle and plug of FIGS. 13 and 14 at one location in the outer body of the engine.

FIGS. 13, 14 and 15 show a modified arrangement for the nozzle and plug. In FIGS. 13, 14 and 15 parts which correspond to parts shown in the figures already referred to are designated by the same reference character but with a double prime mark (″) added thereto. As shown, the plug 44″ and nozzle 46″ in this modified arrangement are located in a plane which includes the rotor axis, and the recess 54″ into which the plug and nozzle project extends across the greater portion of the width of the peripheral wall. A wide angle spray from the nozzle is provided for, such that fuel is sprayed substantially across the entire width of the combustion chamber whereby substantially all of the air moved by the rotor past the plug and nozzle passes directly through the region of the fuel spray and efficient combustion results. Instead of having the plug 44″ and nozzle 46″ in the same plane the plug may be tilted with respect to the plane of the nozzle 46″ to provide space for a cooling passage between the plug and nozzle.

Although several embodiments of the invention have been shown and described, it will be apparent to those skilled in the art that various changes and modifications may be made in the structures illustrated and described without departing from the spirit and scope of the invention. I aim to cover all such modifications and changes in the appended claims.

What is claimed is:

1. A rotary internal combustion engine having a cycle including the four strokes of intake, compression, expansion and exhaust and comprising an outer hollow body and an inner body supported for relative turning movement within the outer body, and turning on an axis eccentric of and parallel to the axis of the outer body, said bodies having respective facing surfaces defining a plurality of variable volume working chambers, said facing surfaces comprising the outer surface of the inner body and the inner surface of the outer body which includes a plurality of arched lobe-defining portions spaced circumferentially about the axis of the outer body, said outer surface of the inner body including a plurality of apex portions spaced circumferentially about the axis of the inner body, said apex portions including seals which extend parallel to the axis of the inner body and engage the inner surface of the outer body, intake passage means arranged to communicate with the space between the exterior of the inner body and interior of the outer body for successively feeding all said chambers as the bodies relatively move, exhaust passage means also arranged to communicate with said space, a nozzle for spraying fuel into each chamber after intake and before exhaust while chamber volume is relatively small, and ignition means for igniting the fuel, the inner surface of the outer body including a recess which is disposed to one side of a lobe junction in a location to communicate with each chamber during a preselected period for the injection of fuel into the chamber, said location being remote from the intake and exhaust ports and such that the recess can communicate with any particular working chamber for no more than a small portion of the time during which said chamber is in communication with the exhaust port, the recess having the discharge end of the nozzle and igniting end of the ignition means extending therein with said discharge end and igniting end being disposed closely adjacent to each other and to the inner surface of the outer body, the fuel nozzle being disposed to spray fuel generally toward said lobe junction, the said recess having a volume which is not more than five percent (5%) of the minimum volume of a working chamber.

2. A rotary internal combustion engine as defined in claim 1 wherein the recess is located to one side of said lobe junction in the direction of rotation of the inner body and fuel is injected upstream relative to the direction of rotation of said inner body.

3. A rotary internal combustion engine as defined in claim 2 wherein the inner body is provided with a trough-like recess for each working chamber, the recess for each chamber being a part thereof and being located closer to the leading end of the chamber than to the trailing end.

4. A rotary internal combustion engine as defined in claim 1 wherein the recess is located to one side of said lobe junction in a direction opposite to the direction of rotation of the inner body and fuel is injected downstream relative to the direction of rotation of the inner body.

5. A rotary internal combustion engine as defined in claim 4 wherein the inner body is provided with a trough-like recess for each working chamber, the recess for each chamber being a part thereof and being located closer to the trailing end of the chamber than to the leading end.

6. A rotary internal combustion engine as defined in claim 1 wherein the recess in the inner surface of the outer body is at a location where pressure is substantially the same on both sides of an apex seal.

7. A rotary internal combustion engine as defined in claim 6 wherein the recess extends across a major portion of the distance between end faces of the inner body whereby fuel may be injected across a wide angle into a working chamber.

8. A rotary internal combustion engine as defined in claim 1 wherein the recess in the inner surface of the outer body is located to the one side of the lobe junction in a direction opposite to the direction of rotation of the inner body and the recess has a volume which is not more than two percent (2%) of the minimum volume of a working chamber.

9. A rotary internal combustion engine having a cycle including the four strokes of intake, compression, expansion and exhaust and comprising an outer hollow body and an inner body supported for relative turning movement within the outer body, and turning on an axis eccentric of and parallel to the axis of the outer body, said bodies having respective facing surfaces defining a plurality of variable volume working chambers, said facing surfaces comprising the outer surface of the inner body and the inner surface of the outer body which includes a plurality of arched lobe-defining portions spaced circumferentially about the axis of the outer body, said outer surface of the inner body including a plurality of apex portions spaced circumferentially about the axis of the inner body, said apex portions including seals which extend parallel to the axis of the inner body and engage the inner surface of the outer body, intake passage means arranged to communicate with the space between the exterior of the inner body and interior of the outer body for successively feeding all said chambers as the bodies relatively move, exhaust passage means also arranged to communicate with said space, a nozzle for spraying fuel into each chamber after intake and before exhaust while chamber volume is relatively small, and ignition means for igniting the fuel, the inner surface of the outer body including a recess which is disposed to one side of a lobe junction in a location to communicate with each chamber during a preselected period for the injection of fuel into the chamber, said location being remote from the intake and exhaust ports and such that the recess is out of communication with any particular working chamber whenever such chamber is in communication with the exhaust port, the recess having the discharge end of the nozzle and igniting end of the ignition means extending therein with said discharge end and igniting end being disposed closely adjacent to each other and to the inner surface of the outer body, the fuel nozzle being disposed to spray fuel generally toward said lobe junction, the said recess having a volume which is a small fraction of the minimum volume of a working chamber and being of a size to only substantially accommodate the discharge end of the nozzle and the igniting end of the ignition means.

No references cited.

SAMUEL LEVINE, *Primary Examiner.*